United States Patent
Jacala et al.

(10) Patent No.: US 7,066,716 B2
(45) Date of Patent: Jun. 27, 2006

(54) COOLING SYSTEM FOR THE TRAILING EDGES OF TURBINE BUCKET AIRFOILS

(75) Inventors: Ariel Caesar Prepena Jacala, Simpsonville, SC (US); Gary M. Itzel, Simpsonville, SC (US); Joshua R. Kornau, Greenville, SC (US); Azadali A. Ladhani, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/940,705

(22) Filed: Sep. 15, 2004

(65) Prior Publication Data
US 2006/0056969 A1    Mar. 16, 2006

(51) Int. Cl.
*F01D 5/18*    (2006.01)

(52) U.S. Cl. .................. 416/1; 415/115; 416/97 R; 416/92

(58) Field of Classification Search ............ 415/1, 415/115; 416/1, 90 R, 92, 95, 97 R
See application file for complete search history.

(56) References Cited

U.S. PATENT DOCUMENTS

| | | | | |
|---|---|---|---|---|
| 5,403,159 A | * | 4/1995 | Green et al. | 416/97 R |
| 5,462,405 A | * | 10/1995 | Hoff et al. | 416/97 R |
| 5,902,093 A | * | 5/1999 | Liotta et al. | 416/97 R |
| 5,931,638 A | * | 8/1999 | Krause et al. | 416/97 R |
| 5,975,851 A | * | 11/1999 | Liang | 416/97 R |
| 6,220,817 B1 | * | 4/2001 | Durgin et al. | 416/97 R |
| 6,224,336 B1 | * | 5/2001 | Kercher | 416/97 R |
| 6,491,496 B1 | * | 12/2002 | Starkweather | 416/97 R |

* cited by examiner

*Primary Examiner*—Igor Kershteyn
(74) *Attorney, Agent, or Firm*—Nixon & Vanderhye P.C.

(57) ABSTRACT

The cooling system includes a plurality of generally radially extending passages within the airfoil for convectively cooling the airfoil. A predetermined number of the passages exit through the airfoil tip. One or more of the remaining passages exit into a plenum adjacent the trailing edge and airfoil tip region of the airfoil and flow radially inwardly along one or more passageways adjacent the trailing edge region. The passageways exit in openings along the pressure side of the airfoil. In this manner, the trailing edge region is convectively cooled as well as film cooled by the film of air exiting the holes.

17 Claims, 3 Drawing Sheets

COOLING SYSTEM FOR THE TRAILING EDGES OF TURBINE BUCKET AIRFOILS

BACKGROUND OF THE INVENTION

The present invention relates to a cooling system for cooling turbine bucket airfoils and particularly to a cooling system employing radial cooling passages for convectively cooling the airfoil and convectively and film cooling the trailing edge region of the airfoil.

Over the years gas turbines have trended towards increased inlet firing temperatures to improve output and engine efficiency. As the gas temperatures have increased, bucket airfoils at the higher metal temperatures exhibit substantial creep damage. The creep damage deteriorates until creep rupture takes place and damages the turbine flow path components. Moreover, with increasing firing temperatures, inlet temperature profiles have a tendency to be hotter at the tip of the airfoil as the hot combustion gas is centrifuged radially outwardly towards the tip. This renders the higher spans of the airfoils more susceptible to creep damage. Also, because of the shape of the airfoils, the trailing edges have increasingly exhibited distress including oxidation, creep and low cycle fatigue cracking as the airfoils see increasing temperatures.

In prior bucket designs, electrochemical machining (ECM) methods have been used to form cooling passages generally radially through the airfoil of the bucket. Particularly, cooling holes are formed using the shaped tube electrochemical machining (STEM) process by which holes are "drilled" using a round guide tube which electrochemically erodes a passage which is the same shape as the guide tube. The guide tube drilling extends the entire length of the airfoil. A separate drill pass is typically initiated at the bottom of the dovetail attachment of the bucket to the rotor wheel and meets the passage eroded by the airfoil STEM drilled passage. Thus, cooling air conveyed from the dovetail of the bucket to the tip of the airfoil through these drilled passages convectively cool the airfoil. However, the shaped tubes tend to wander as the length of the drilled hole increases. Also, the airfoils are shaped such that the trailing edges are very thin for aerodynamic efficiency. As a consequence, the STEM drilled holes can only be drilled within a certain distance from the trailing edge and necessarily leave a large portion of the trailing edge still relatively uncooled. Consequently, there is a need for a system for more effectively cooling trailing edge regions of a bucket airfoil.

BRIEF DESCRIPTION OF THE INVENTION

In a preferred embodiment of the present invention, there is provided a cooling system for a turbine bucket having an airfoil, a base and a platform interface between the airfoil and the base. The airfoil preferably has a plurality of passages extending generally radially therealong for communication with a supply of cooling medium at radial inner ends of the passages thereby convectively cooling the airfoil as the cooling medium flows generally radially outwardly along passages toward a tip of airfoil. A predetermined number of the passages are formed in the airfoil exit openings adjacent the airfoil tip for flowing spent cooling medium into the hot gas path of the turbine. At least one remaining passage of the plurality of passages lies in communication adjacent a tip of airfoil with a cooling passageway extending generally inwardly along a trailing edge region of the airfoil for convectively cooling the trailing edge region. The passageway terminates in an exit hole along one side and intermediate the length of the airfoil for film cooling the trailing edge.

In a further preferred embodiment of the present invention, there is provided a method of cooling a turbine bucket having an airfoil, a base and a platform interfaced between the airfoil and the base. The method includes the steps of providing the airfoil with a plurality of passages extending generally radially therealong toward a tip of the airfoil; flowing a cooling medium generally radially outwardly along the passages toward the airfoil tip for convectively cooling the airfoil; providing exit openings adjacent the airfoil tip for a predetermined number of the passages enabling flow of spent cooling medium into a hot gas path of the turbine; communicating a cooling medium at a location adjacent the tip of the airfoil from at least one of remaining passages of the plurality of passages with a cooling passageway extending generally radially inwardly along a trailing edge region of the airfoil for convectively cooling the trailing edge region; and terminating the passageway in an exit hole along one side of the airfoil intermediate the length of the airfoil for film cooling the trailing edge.

DETAILED DESCRIPTION OF THE INVENTION

Figure 1:
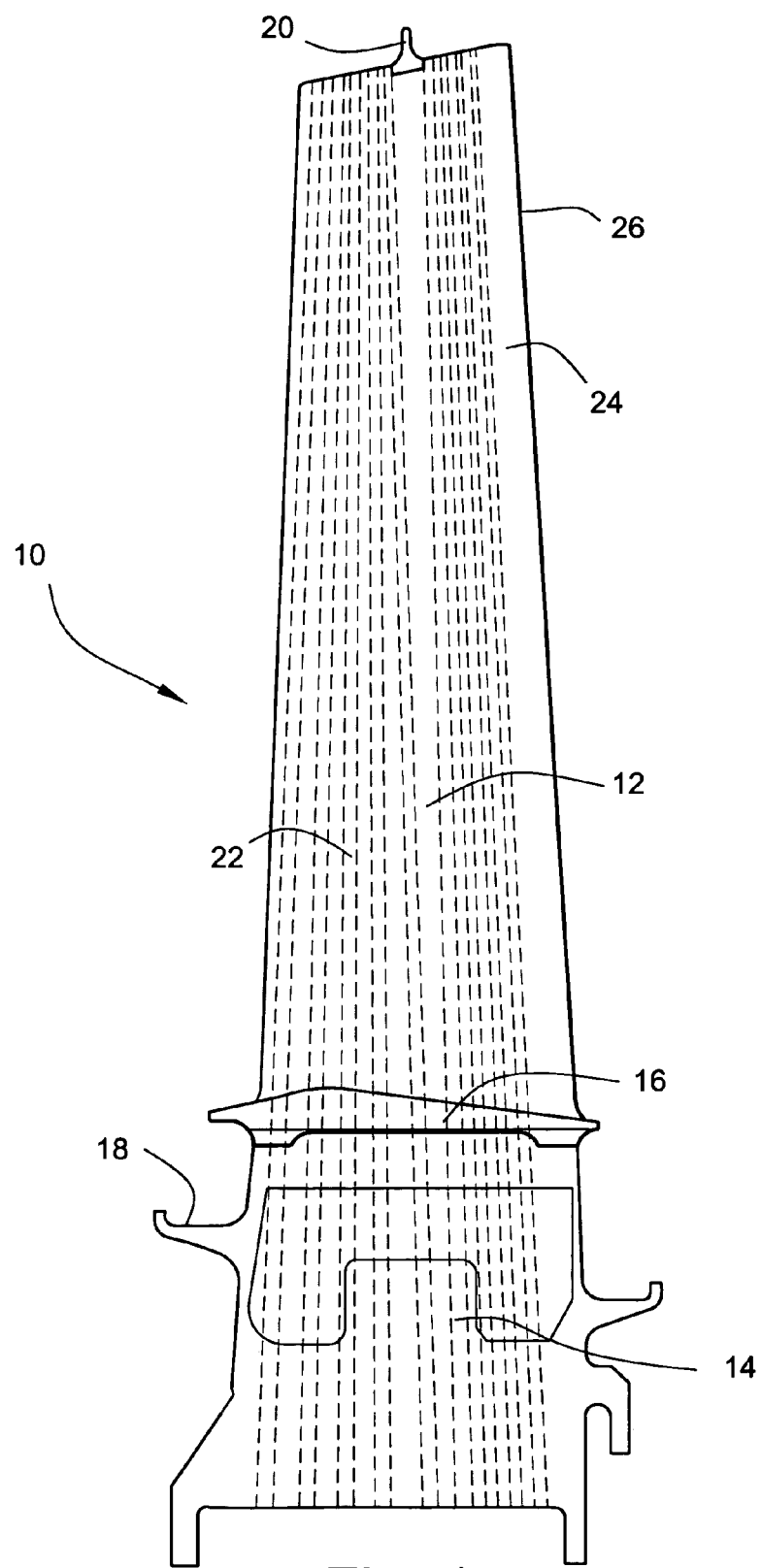
FIG. 1 is a side elevational view of a representative turbine bucket illustrating a prior art cooling system with the various cooling passages illustrated in dashed lines.

Referring now to the drawings, particularly to FIG. 1, there is illustrated a conventional turbine bucket generally designated 10 including an airfoil 12, a base 14 and a platform 16 interfaced between the airfoil 12 and base 14. The turbine bucket 10 includes angel wing seals 18 and a tip shroud 20 for sealing the hot gases in the hot gas flow path (not shown) of the turbine. Additionally, airfoil 10 includes a plurality of generally radially extending passages 22 from the base 14 through the platform 16 and airfoil 12 exiting through the tip shroud 20 into the gas flow path. Typically, a cooling medium such as air is supplied to these passages for convectively cooling the airfoil 12 as the air flows generally radially outwardly exiting from the airfoil tip into the hot gas path. As illustrated in FIG. 1, there is a region 24 adjacent the trailing edge 26 which remains relatively uncooled. As noted, the passages 22 cannot be "drilled" sufficiently close to the trailing edge 26 while retaining the structural integrity of the trailing edge region 24.

Figure 2:
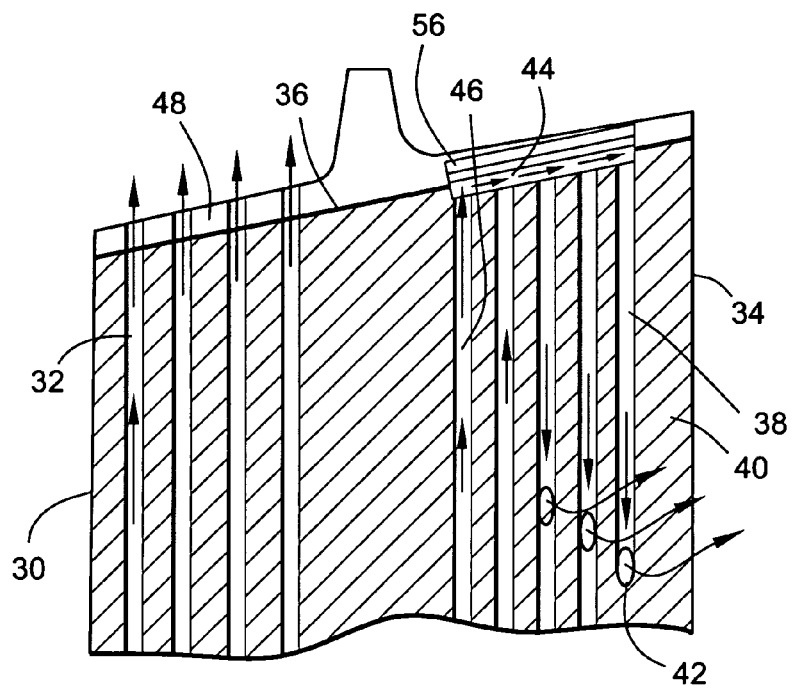
FIG. 2 is a fragmentary cross-sectional view through an airfoil incorporating a cooling system according to a preferred aspect of the present invention.
Figure 3:
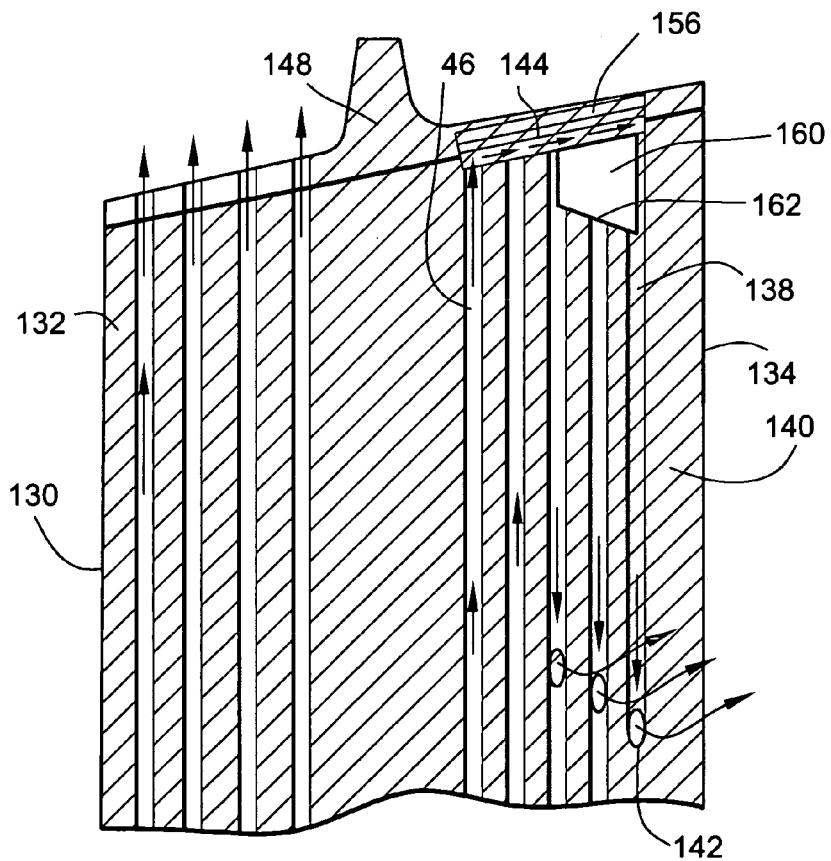
FIG. 3 is a view similar to FIG. 2 illustrating a further embodiment hereof.

In FIGS. 2 and 3, an in accordance with a preferred example of the present invention, at least portions of the cooling medium, e.g., air, are rerouted to effect greater cooling in the trailing edge region of the airfoil which is not specifically addressed by the prior art of FIG. 1. In the cooling system hereof, cooling air flows in a generally radial inward direction along passageways adjacent the trailing edge and is discharged as a film along a side of the airfoil. The passageways and exit holes perform the double function of convectively cooling the trailing edge region and forming an insulating film along the trailing edge region.

In the preferred example of the airfoil 30 illustrated in FIG. 2, a plurality of passages 32 are provided and extend generally radially along the length of the airfoil. These passages 32 are drilled using the aforementioned STEM drilling process. A predetermined number of the passages 32 are drilled from the tip 36 of the airfoil in a generally radially inward direction as close as possible to the trailing edge 34 taking into consideration the wandering characteristics of the shaped tube diameter utilized in the STEM process. Thus, one or more passageways 38 of the passages 32 are formed to extend generally radially along the airfoil as close to the trailing edge 34 as possible. These one or more passageways 38 open laterally through one side, preferably the pressure side, of the airfoil, at the critical region that requires the most cooling, i.e., the trailing edge region 40 of the airfoil. The passageways 38 are preferably circular in cross section. However, when the passageways break through the side of the airfoil, the holes 42 thus formed have generally elliptical profiles. The elliptical profile of the holes 42 presented in the stress field mitigates the effect of the resulting stress concentration.

In order to provide a cooling medium flow in the one or more passageways 38, a recess is formed radially inwardly of and through the airfoil tip. The recess 44 lies in communication with one or more of the radial passages 32. In the illustrated embodiment, two passages 46 of the passages 32 lie in communication adjacent the airfoil tip with the recess 44, although it will be appreciated that one or more passages 44 may be provided. It will also be appreciated that the recess 44 forms a plenum adjacent the airfoil tip 36 in communication with one or more of the passageways 38. Consequently, it will be appreciated that the cooling air flows generally radially outwardly along the one or more radial passages 46 where the flow enters the plenum 44 and reverses direction for flow radially inwardly along the passageways 38. The flow in passageways 38 exits through the holes 42 along the pressure side of the airfoil. As a consequence of this generally radially inward flow of cooling air in passageways 38, the trailing edge region of the airfoil is convectively cooled. Also, a thin film of cooling air is supplied via the exit holes 42 along the pressure side of the trailing edge region to film cool the trailing edge region.

Figure 4:
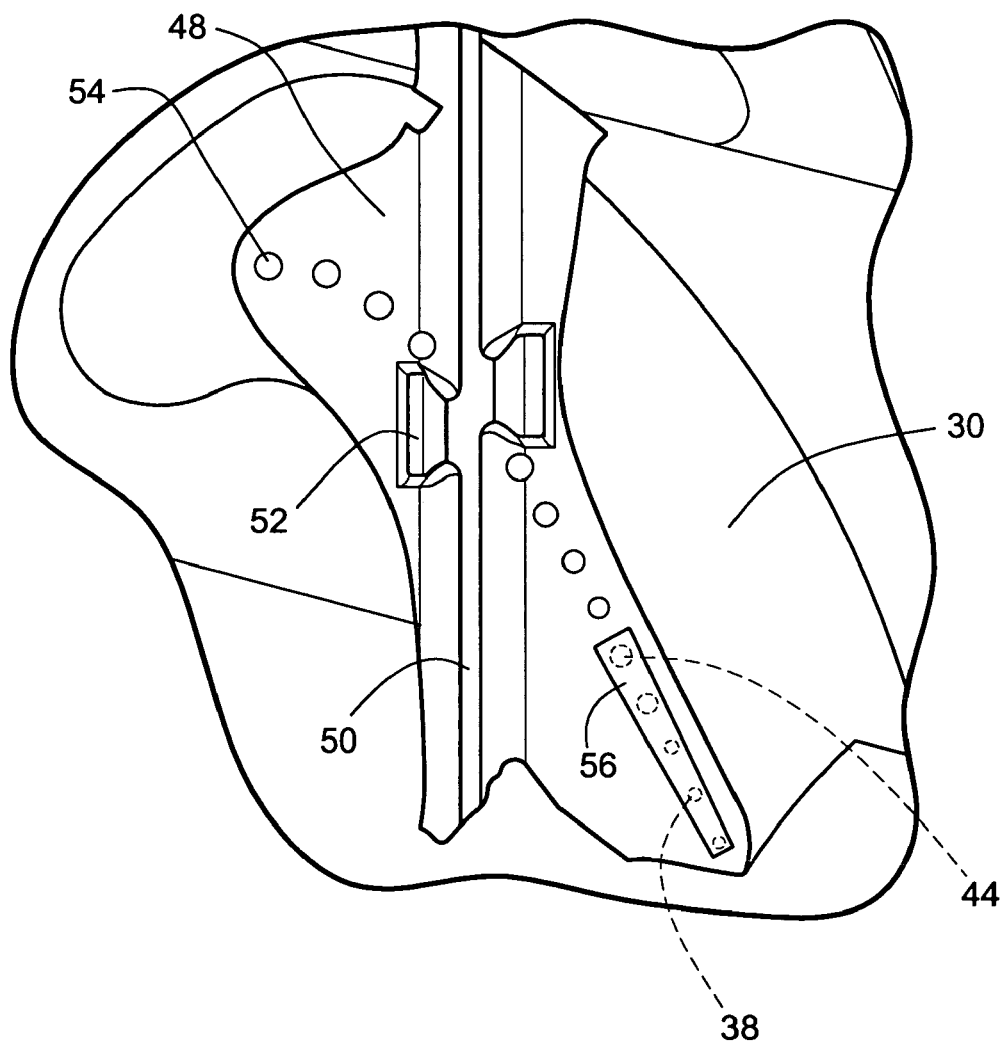
FIG. 4 is a top view illustrating the airfoil tip and a cover for the airfoil.

Referring to FIG. 4, the tip of the airfoil 30 is provided with a shroud cover 48. The shroud cover includes a shroud seal 50 together with a cutter a tooth 52 which forms a groove along a fixed shroud, not shown, of the turbine. As illustrated in FIG. 4, the passages 32 have exit openings 54 through the shroud cover 48 whereby the cooling air which convectively cools major portions of the airfoil, empties into the hot gas path. The plenum 44, however, is covered with a cover or cap plug 56 which may be brazed, welded or otherwise secured to the tip of the airfoil. Thus, the plenum 44 is closed by the cap cover 56, enabling the generally radially outwardly flowing cooling air through the one or more predetermined passages 44 to reverse direction for flow in a generally radially inward direction to convectively cool the trailing edge region of the airfoil and film cool the trailing edge region upon exiting through the exit holes 42.

Referring to FIG. 3, like reference numerals are applied to like parts as in FIG. 2, preceded by the numeral 1. In this embodiment, the plenum 144 is extended or formed much deeper in the tip of the airfoil. The base 162 of the plenum 160 is spaced radially inwardly at the airfoil tip and inclined toward the trailing edge. Thus, the extended plenum 160 enables the STEM drilling process to form the passageways 138 to a deeper extent within the airfoil than in the embodiment of FIG. 2. In this manner, the exit holes 142 penetrate the pressure side of the airfoil at locations radially inwardly of the locations of the holes 42 in the embodiment of FIG. 2.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling system for a turbine bucket comprising:
   an airfoil, a base and a platform interfaced between the airfoil and base;
   said airfoil having a plurality of passages extending generally radially therealong for communication with a supply of cooling medium at radial inner ends thereof and convectively cooling the airfoil as the cooling medium flows generally radially outwardly along the passages toward a tip of the airfoil;
   a predetermined number of said passages having exit openings adjacent said airfoil tip for flowing spent cooling medium into a hot gas path of the turbine;
   at least one remaining passage of said plurality of passages being in communication adjacent the tip of the airfoil with a cooling passageway extending generally inwardly along a trailing edge region of the airfoil for convectively cooling the trailing edge region,
   said passageway terminating in an exit hole along one side and intermediate the length of the airfoil for film cooling the trailing edge along said one airfoil side.

2. A system according to claim 1 wherein said hole exits through the pressure side of the airfoil.

3. A system according to claim 2 wherein said hole has an elliptical profile along said pressure side.

4. A system according to claim 1 wherein said passageway extends along a path closer to the trailing edge than said one passage.

5. A system according to claim 1 wherein remaining passages of said plurality of passages lie in communication adjacent the tip of the airfoil with at least two passageways extending generally radially inwardly along the trailing edge region of the airfoil for convectively cooling the trailing edge region of the airfoil, said two passageways terminating in exit holes along said one side and intermediate the length of the airfoil for film cooling the trailing edge along said one airfoil side.

6. A system according to claim 5 wherein said exit holes lie at different radial locations along the length of said airfoil.

7. A system according to claim 1 wherein said airfoil includes a crossover plenum adjacent said airfoil tip in communication with an outlet of said one remaining passage and an inlet to said passageway.

8. A system according to claim 7 wherein said plenum opens through the tip of the airfoil and a cover closes the plenum at the tip of the airfoil.

9. A system according to claim 8 wherein said plenum has a base spaced radially inwardly of the airfoil tip.

10. A system according to claim 8 wherein said base is inclined radially inwardly in a direction toward said trailing edge.

11. A system according to claim 1 wherein remaining passages of said plurality of passages lie in communication adjacent the tip of the airfoil with at least two passageways extending generally radially inwardly along the trailing edge region of the airfoil for convectively cooling the trailing edge region of the airfoil, said two passageways terminating in exit holes along said one side and intermediate the length of the airfoil for film cooling the trailing edge along said one airfoil side, said plenum including a crossover plenum adjacent said airfoil tip in communication with outlets of said remaining passages and inlets to said two passageways.

12. A system according to claim 11 wherein said plenum opens through the tip of the airfoil and a cover closes the plenum at the tip of the airfoil.

13. A system according to claim 12 wherein said plenum has a base spaced radially inwardly of the airfoil tip and inclined in a radial inward direction toward said trailing edge.

14. A system according to claim 13 wherein said exit holes of said passageways lie at different radial locations along the length of said airfoil.

15. A method of cooling a trailing edge region of an airfoil forming part of a turbine bucket having a base and a platform interfaced between the airfoil and base comprising the steps of:

providing said airfoil with a plurality of passages extending generally radially therealong toward a tip of the airfoil;

flowing a cooling medium generally radially outwardly along said passages toward the airfoil tip for convectively cooling the airfoil;

providing exit openings adjacent said airfoil tip for a predetermined number of said passages enabling flow of spent cooling medium into a hot gas path of the turbine;

communicating the cooling medium at a location adjacent the tip of the airfoil from at least one of remaining passages of said plurality of passages with a cooling passageway extending generally radially inwardly along a trailing edge region of the airfoil for convectively cooling the trailing edge region; and terminating the passageway in an exit hole along one side of the airfoil intermediate the length of the airfoil for film cooling the trailing edge along said one airfoil side.

16. A method according to claim 15 including providing a crossover plenum adjacent the tip of the airfoil for flowing cooling medium from an outlet of said one remaining passage into an inlet of said passageway.

17. A method according to claim 16 including securing a cover plate to the tip of the airfoil to close said plenum.

* * * * *